US012794190B2

(12) United States Patent
McClean

(10) Patent No.: US 12,794,190 B2
(45) Date of Patent: Nov. 10, 2026

(54) SHORT FIBER LENGTH MULTI-CORE FIBER (MCF) ERBIUM-DOPED FIBER AMPLIFIERS (EDFAS)

(71) Applicant: II-VI Delaware, Inc., Wilmington, DE (US)

(72) Inventor: Ian McClean, Brixham (GB)

(73) Assignee: II-VI Delaware, Inc., Wilmington, DE (US)

( * ) Notice: Subject to any disclaimer, the term of this patent is extended or adjusted under 35 U.S.C. 154(b) by 891 days.

(21) Appl. No.: 18/097,577

(22) Filed: Jan. 17, 2023

(65) Prior Publication Data

US 2024/0243539 A1 Jul. 18, 2024

(51) Int. Cl.

| | |
|---|---|
| ***H01S 3/067*** | (2006.01) |
| ***H01S 3/094*** | (2006.01) |
| ***H01S 3/0941*** | (2006.01) |
| ***H01S 3/10*** | (2006.01) |
| ***H01S 3/16*** | (2006.01) |

(52) U.S. Cl.

CPC .... *H01S 3/06737* (2013.01); *H01S 3/094003* (2013.01); *H01S 3/094069* (2013.01); *H01S 3/0941* (2013.01); *H01S 3/10015* (2013.01); *H01S 3/1608* (2013.01)

(58) Field of Classification Search

CPC .................................................. H01S 3/06737

See application file for complete search history.

(56) References Cited

U.S. PATENT DOCUMENTS

| | | | | |
|---|---|---|---|---|
| 11,609,376 B2 * | 3/2023 | Kopp | G02B 6/0288 | |
| 2011/0279888 A1 * | 11/2011 | Fini | H01S 3/06737 | 359/334 |
| 2013/0236175 A1 * | 9/2013 | Sethumadhavan | G02B 6/29383 | 398/43 |
| 2013/0251320 A1 * | 9/2013 | Hayashi | G02B 6/4401 | 385/100 |
| 2014/0168756 A1 * | 6/2014 | Zhu | H01S 3/06754 | 385/127 |

(Continued)

FOREIGN PATENT DOCUMENTS

| | | | |
|---|---|---|---|
| EP | 2930799 A2 * | 10/2015 | G02B 6/4404 |
| JP | 2019216240 A * | 12/2019 | H01S 3/1608 |
| JP | 2021518056 A * | 7/2021 | H04J 14/052 |

*Primary Examiner* — Deandra M Hughes

(74) *Attorney, Agent, or Firm* — McAndrews, Held & Malloy, Ltd.

(57) ABSTRACT

Systems and methods are provided for short fiber length multi-core fiber (MCF) Erbium-doped fiber amplifiers (EDFAs). An enhanced Erbium-doped fiber amplifier (EDFA) includes one or more pumps configured to pump light during the amplifying, and a multiple-core fiber (MCF) doped with an active dopant for communicating the signal light within the EDFA during the amplifying. The multiple-core fiber (MCF) is in optical communication with the signal light and is in optical communication with the one or more pumps, where the amplifying included applying a plurality of gain sections, with each gain section associated with a corresponding fiber length, and where applying one or more of the plurality of gain sections including use of one or more loops via one or more corresponding cores in the multiple-core fiber (MCF). The multiple-core fiber (MCF) is an Erbium-doped fiber (EDF).

17 Claims, 8 Drawing Sheets

(56) References Cited

U.S. PATENT DOCUMENTS

2014/0307304 A1* 10/2014 Zhu .................... G02B 6/02347 359/341.3
2015/0085351 A1* 3/2015 Fontaine ........... H01S 3/094065 359/341.3
2017/0279242 A1* 9/2017 Yaman .................. H01S 3/1608
2018/0102626 A1* 4/2018 Ip ....................... H04B 10/2912
2018/0109067 A1* 4/2018 Yaman .............. H01S 3/094038
2019/0115715 A1* 4/2019 Hasegawa ............. H01S 3/0941
2019/0140418 A1* 5/2019 Le Taillandier De Gabory .......... H04B 10/294
2019/0207358 A1* 7/2019 Hasegawa ......... H01S 3/094065
2019/0221987 A1* 7/2019 Le Taillandier De Gabory .......... H01S 3/10015
2019/0379174 A1* 12/2019 Shimakawa ......... G02B 6/3526
2019/0379175 A1* 12/2019 Shimakawa ........... G02B 6/264
2020/0313382 A1* 10/2020 Trinel ................. H01S 3/06737
2020/0381888 A1* 12/2020 Mizuno ................... H01S 3/302
2021/0028590 A1* 1/2021 Le Taillandier De Gabory .......... H04B 10/2916
2021/0194218 A1* 6/2021 Le Taillandier De Gabory .......... H01S 3/13013
2022/0045473 A1* 2/2022 Matsumoto ....... H01S 3/094007
2022/0052781 A1* 2/2022 Rekaya ................. H04J 14/052
2022/0115830 A1* 4/2022 Yanagimachi ........ H01S 3/0014
2022/0190542 A1* 6/2022 Wakayama ............. H01S 3/091
2022/0329035 A1* 10/2022 Zhang ................. H01S 3/06716
2023/0275390 A1* 8/2023 Ohtsuka ................... G02B 6/32 359/341.1

* cited by examiner

SHORT FIBER LENGTH MULTI-CORE FIBER (MCF) ERBIUM-DOPED FIBER AMPLIFIERS (EDFAS)

TECHNICAL FIELD

Aspects of the present disclosure relate to fiber-optic communication, and particularly to optical amplification. More specifically, certain implementations of the present disclosure relate to methods and systems for short fiber length multi-core fiber (MCF) Erbium-doped fiber amplifiers (EDFAs).

BACKGROUND

Limitations and disadvantages of conventional and traditional devices and solutions for transmitting and receiving optical signals will become apparent to one of skill in the art, through comparison of such systems with some aspects of the present disclosure as set forth in the remainder of the present application with reference to the drawings.

BRIEF SUMMARY

System and methods are provided for short fiber length multi-core fiber (MCF) Erbium-doped fiber amplifiers (EDFAs), substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
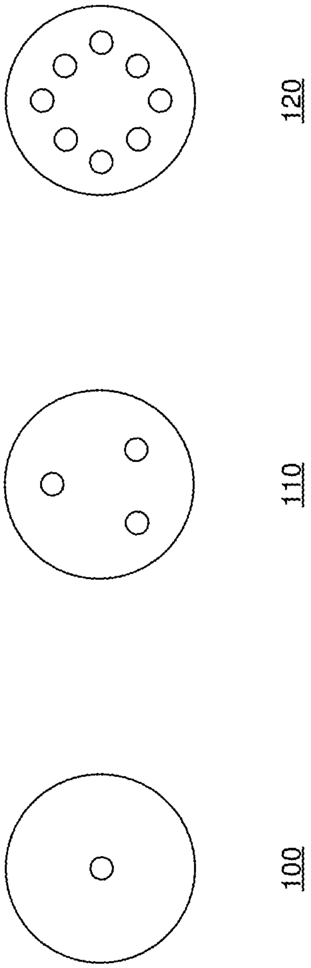
FIG. 1 illustrates an example single core optical fiber along with example multi-core optical fibers.

In a doped fiber amplifier, an optical signal is transmitted through a doped fiber. At the same time, ions in the doped fiber are energized using pump light, which is provided at a different wavelength to the optical signal from a pump laser diode. Photons of the optical signal interact with the energized ions, causing the ions to give up some of their energy in the form of photons at the same wavelength as the photons of the optical signal, with the ions returning to a lower energy state. The optical signal is thereby amplified as it passes through the doped fiber. For example, an Erbium-doped fiber amplifier (EDFA) may be used in an optical fiber link to amplify signals at low loss in a 1550-nm wavelength range of the fiber. In the EDFA, a short length (e.g., few meters) of the optical fiber is doped with the rare-earth element Erbium. A pump laser injects light into the Erbium-doped fiber at a given wavelength to excite the Erbium ions in the fiber. Energy is transferred to the optical signal passing through the fiber when the excited ions return to an unexcited state. The wavelength to be amplified may be in the 1550-nm range, and the wavelength of the pump laser may be 980 and/or 1480-nm.

Existing EDFA based solutions or designs, particularly those used in optical amplifier devices, may have some limitations and disadvantages. For example, performance of an Erbium-doped fiber amplifier (EDFA) may be limited or otherwise affected by physical constraints. In this regard, optical transmit/receive modules in telecommunication networks are moving to very compact and often pluggable formats, with the optical power of transmitted signals often needing to be amplified to a higher power than the transmitter may provide. Further, EDFAs may be commonly used to provide the needed gain. However, EDFAs require lengths of Erbium-doped optical fiber (EDF) to create signal gain. In this regard, often the EDF may be very long (e.g., several 10*s* of meters), particularly when certain signals are amplified (e.g., signals in the L-band), which may restrict the chance of fitting an EDFA into the required compact module. Thus, physical constraints impose length restrictions on EDFA based devices (e.g., amplifier devices). There is also a need to reduce the total length of fiber in larger amplifiers such as those used in reconfigurable optical add-drop multiplexer (ROADM) nodes, to reduce the overall physical size of the amplifier and consequentially the ROADM. Therefore, there is a clear need to reduce the length of active Erbium fiber in optical amplifiers.

Accordingly, solutions based on the present disclosure overcome, or at least reduce the effects of one or more of the problems set forth above, particularly the need for increasing the optical path length of fiber in an EDFA while still maintaining the desired physical size of the EDFA and/or devices incorporating such EDFA. In particular, in various example implementations, Erbium-doped multi-core fiber (MCF) may be used to reduce total physical length of Erbium-doped fiber (EDF) required in EDFAs. Use of such multi-core fiber (MCF) may be particularly desirable and advantageous in EDFAs that require long lengths of fiber, such as those configured for supporting Super-L-band based operations. Nonetheless, such MCF EDFAs may also be utilized for other EDFA bands, such as L-band and C-band, to reduce fiber length required therein. The reduced length EDF, and MCF-EDFAs incorporating such reduced length EDF, may be used in pluggable amplifiers, in dense wavelength division multiplexing (DWDM) amplifier modules/line-cards, and the like. In some example implementations, pseudo variable EDF lengths may be created, such as by incorporating such measures by adding losses to one or more loops, having multiple passes through more than one loop, etc. In some example implementations, the MCF-EDFAs may incorporate a pump for each core as is conventionally done with single-mode fiber (SMF). Alternatively, in some example implementations, multiple cores may share a single pump. In some example implementations, pumping of all EDF paths may be done using one pump. This may be done by incorporating a cladding structure in the EDFA. Example implementations in accordance with the present disclosure are illustrated in and described with respect to FIGS. 1-7 below.

FIG. 1 illustrates an example single core optical fiber along with example multi-core optical fibers. Shown in FIG. 1 are optical fibers 100, 110, and 120—or more specifically, cross sections thereof.

As shown in FIG. 1, fiber 100 is a conventional single core fiber, fiber 110 is an example 3-core multi-core fiber (MCF), and fiber 120 is an example 8-core multi-core fiber (MCF). In this regard, optical fiber has commonly used single core designs where a signal optical path exists, as illustrated by fiber 100. In some instances, however, it may be desirable to use multiple-core fiber, such as fiber 110 and/or fiber 120. In this regard, having more than one core in an optical fiber may allow for use of multiple paths in one fiber. Use of such multiple-core fibers may be desirable as such multiple-core fibers may be used to reduce the physical size of a fiber bundle and/or reduce the number of individual components in a link needed when using multi-core fiber (MCF). For example, a MCF Erbium-doped fiber amplifier (EDFA) may use one pump laser for all cores in a fiber which reduces the number of pump lasers needed.

In some instances, multiple cores with each core being doped with Erbium may be used, to take advantage of the MCF structure. For example, a MCF EDFA may use one pump laser for all cores in a fiber, instead of one pump per core in a single-core fiber, which again allows for reducing the number of pump lasers needed.

Figure 2:
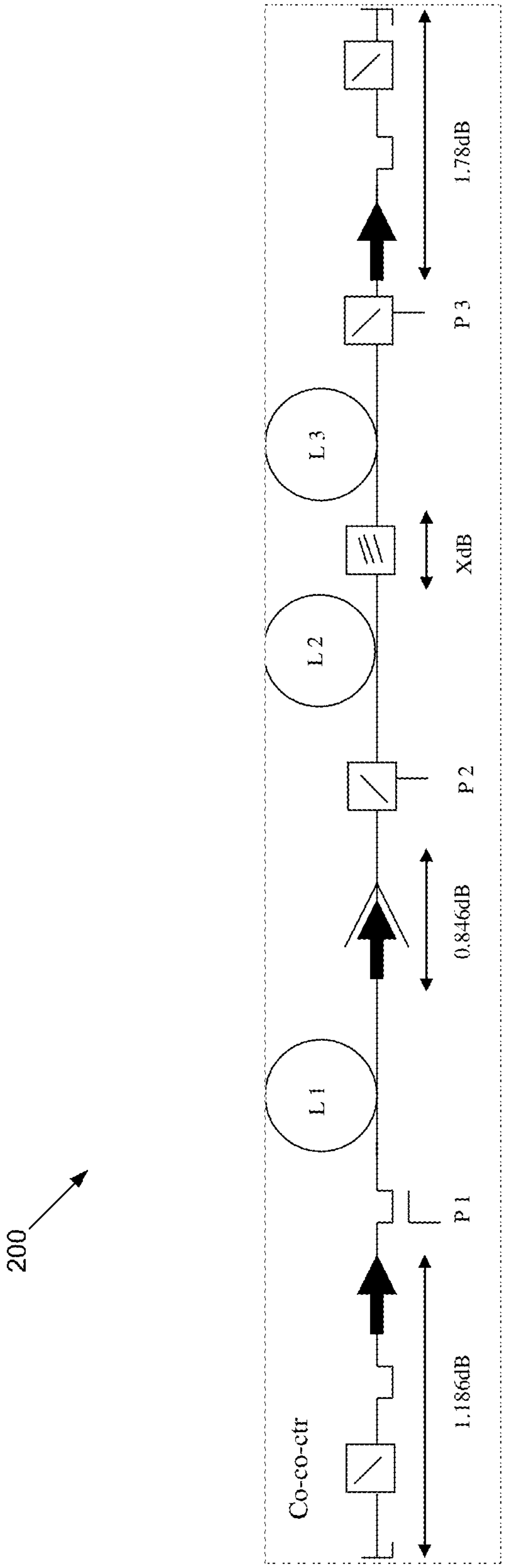
FIG. 2 illustrates an example Erbium-doped fiber amplifier (EDFA) based topology for Super-L-band with multiple Erbium-doped optical fiber (EDF) lengths.

FIG. 2 illustrates an example Erbium-doped fiber amplifier (EDFA) based topology for Super-L-band with multiple Erbium-doped optical fiber (EDF) lengths. Shown in FIG. 2 is Erbium-doped fiber amplifier (EDFA) based topology 200.

The EDFA based topology 200 may correspond to, and/or may be utilized within, an EDFA amplifier device structure. In this regard, in some instances, Erbium-doped fibers may be designed and/or implemented with multiple lengths of EDF, with each length of EDF conventionally being a single-core fiber, and thus multiple fibers are needed. This may be particularly the case for L-band amplifiers, particularly when the bandwidth of an EDFA is increased in the L-band to wavelengths to 1625 nm, known as the Super-L-band. These generally require even longer EDF fiber lengths nearing 100 m. For example, as shown in FIG. 2, the topology 200 may be simple EDFA topology for Super-L-band with 3 EDF sections corresponding to, respectively, EDF lengths, L1, L2, and L3. The topology 200 comprises three pump lasers (P1, P2, and P3) used to inject light into the Erbium-doped fiber for, respectively, each of the EDF sections/lengths L1, L2, and L3.

The topology 200 may represent a topology based on conventional solutions. Use of conventional approaches in topologies such as the topology 200 may have drawbacks and/or limitations, however. In this regard, as noted above, such approach would result in long fiber length topologies, which may not be suitable or desirable for deployment in devices (e.g., amplifier devices) that may have to conform to physical (e.g., spatial) constraints. In this regard, the length of EDF makes it extremely hard to fit these EDFA into compact and/or pluggable modules. Thus, reducing the overall size of the topology while still providing the same (or similar) EDF fiber lengths is very desirable. In accordance with the present disclosure, this may be done by use of loops via the multiple cores in the multi-core fiber (MCF).

Figure 3:
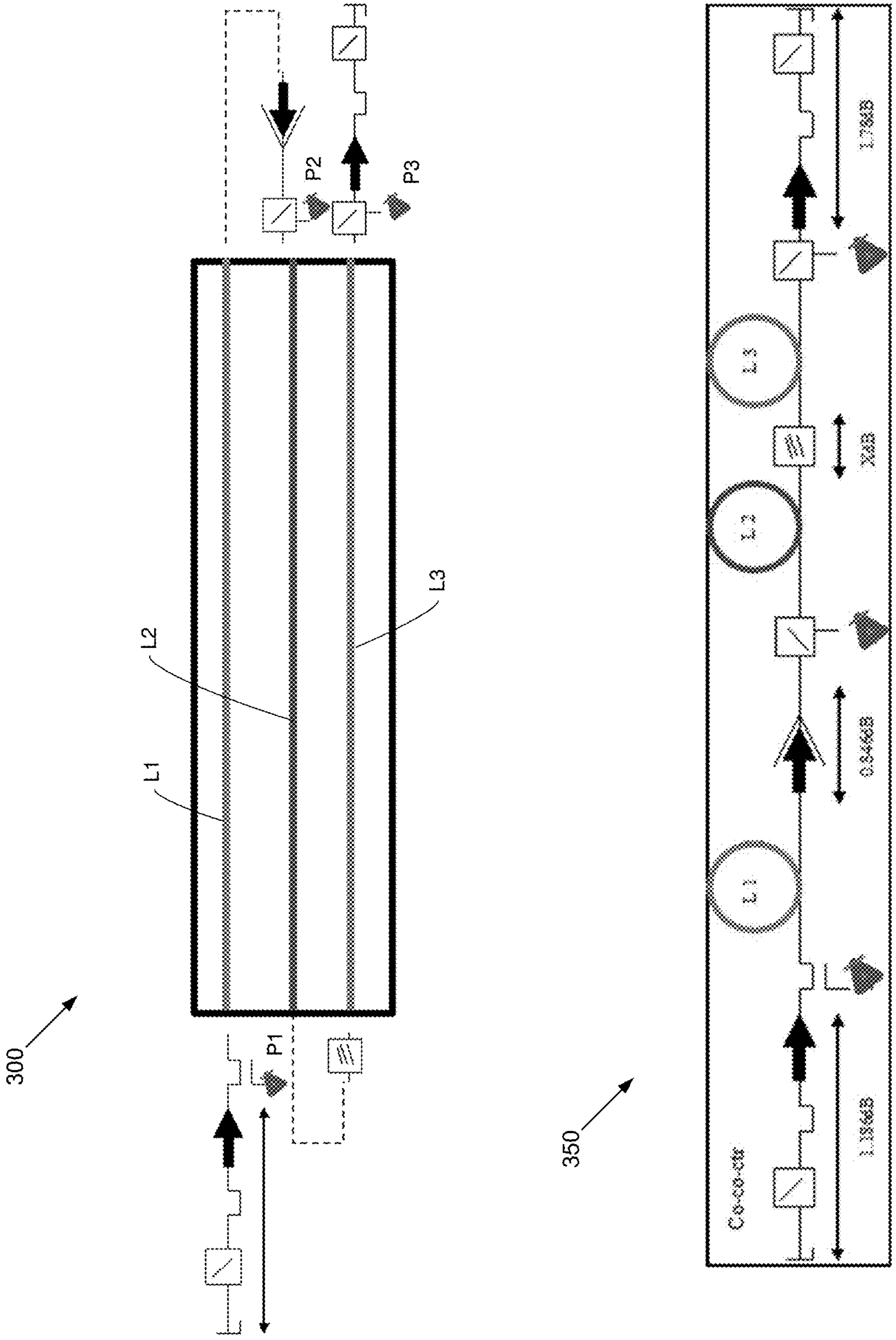
FIG. 3 illustrates an example multi-core fiber (MCF) that provides multiple Erbium-doped optical fiber (EDF) loops with single EDF length per loop.

FIG. 3 illustrates an example multi-core fiber (MCF) that provides multiple Erbium-doped optical fiber (EDF) loops with single EDF length per loop. Shown in FIG. 3 is multi-core fiber (MCF) Erbium-doped fiber amplifier (EDFA) based MCF EDFA based topology 300. Also shown in FIG. 3 is non-MCF Erbium-doped fiber amplifier (EDFA) based topology 350.

As shown in FIG. 3, the topology 350 is substantially similar to the topology 200 of FIG. 2. The MCF EDFA based topology 300 may be functionally similar to the topology 350 (and the topology 200 of FIG. 2), and may operate in a substantially similar manner, such as when used in, e.g., optical fiber based implementations. For example, the MCF EDFA based topology 300 similarly may be used within an optical fiber amplifier device (e.g., a pluggable amplifier device). However, the MCF EDFA based topology 300 may incorporate use of multiple gain sections (loops) to reduce overall physical length. In other words, the topology 350 may be functionally similar to the MCF EDFA based topology 300 but with conventional design—that is, without use of any features based on the present disclosure to reduce overall size. As such, as implemented, in the MCF EDFA based topology 300 the total physical length of multiple gain sections (or fiber loops) of EDF may be reduced by using MCF doped with Erbium (e.g., fiber 110 and fiber 120 of FIG. 1). Each core may be set and/or used as a single gain section/loop.

In the example embodiment shown in FIG. 3, the MCF EDFA based topology 300 may be implemented using a 3-core MCF, which may provide 3 EDF loops. The three EDF loops may be used to provide the same functions as EDF sections corresponding to EDF lengths L1, L2, and L3 in the conventional topologies 350 and 200. Thus, the use of 3-core MCF in the MCF EDFA based topology 300, which may provide 3 EDF loops with a total physical EDF length otherwise required for a single loop, results in a reduction of overall physical length by factor of 3—that is, with the total physical length being a third (⅓) of what the total physical length would have to be to provide the same functionality using conventional topologies.

Figure 4A:
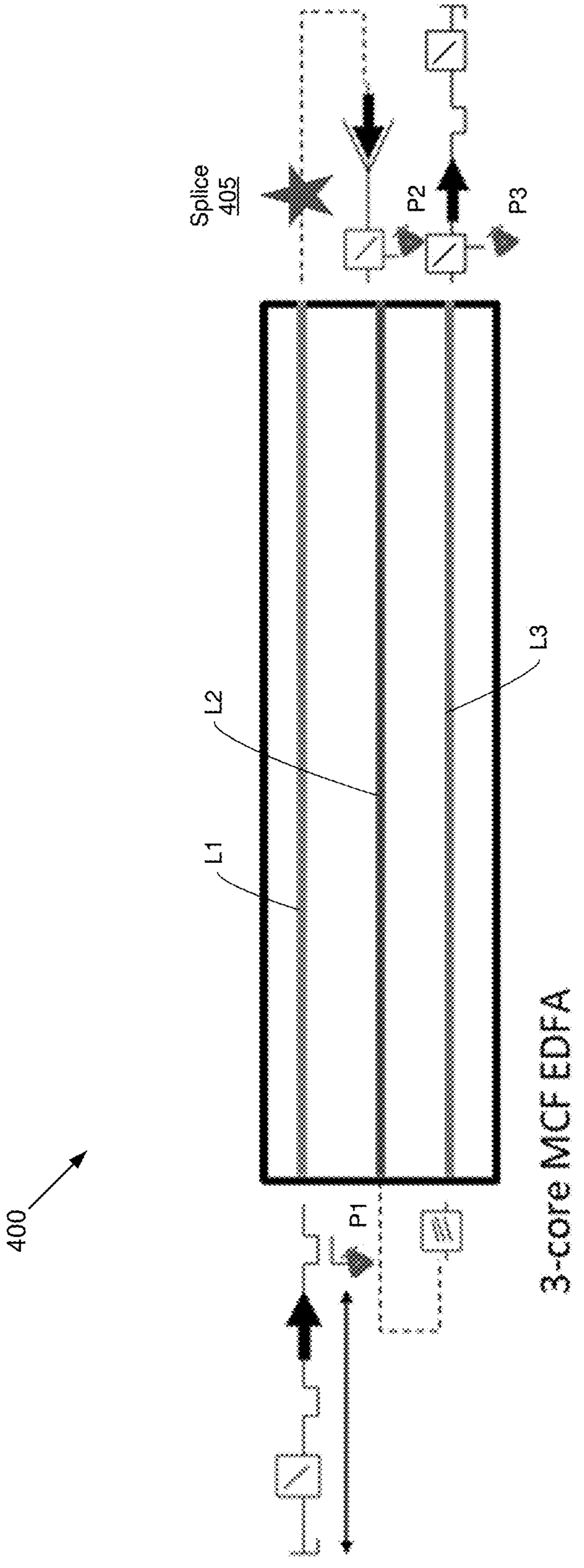
FIGS. 4A-4B illustrate example multi-core fiber (MCF) based topologies that provide multiple Erbium-doped optical fiber (EDF) loops with added losses.
Figure 4B:
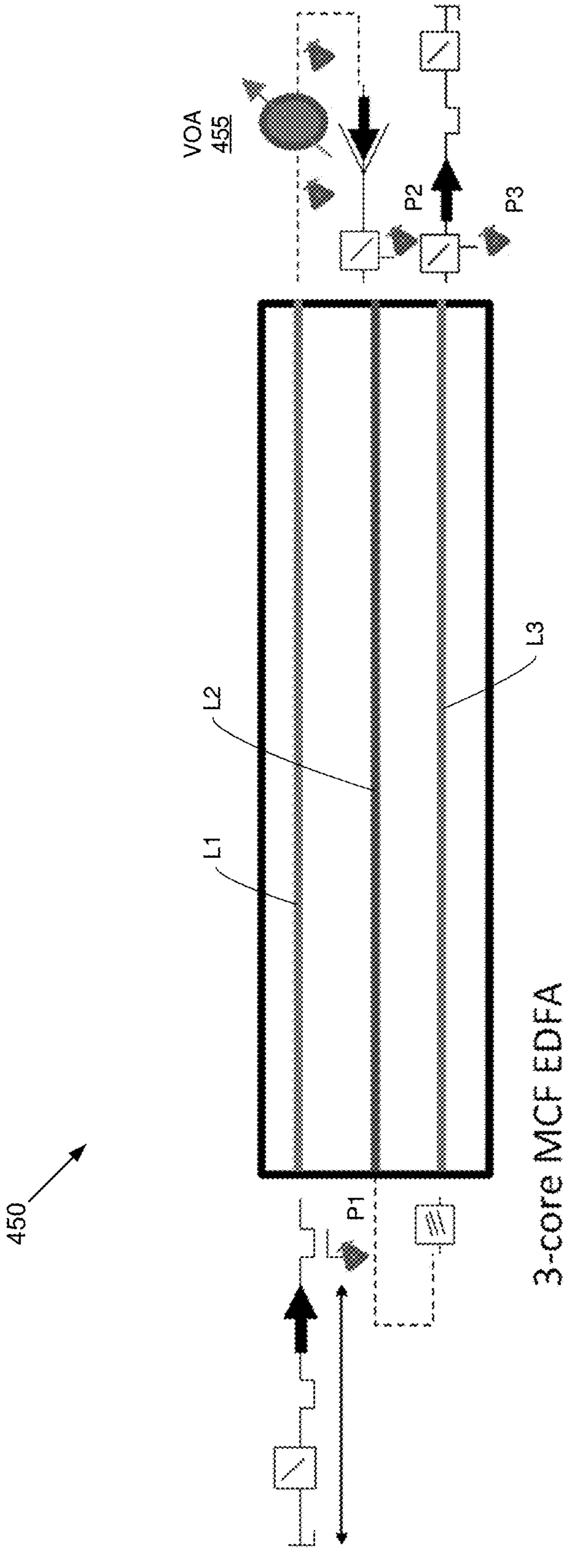

FIGS. 4A-4B illustrate example multi-core fiber (MCF) based topologies that provide multiple Erbium-doped optical fiber (EDF) loops with added losses. Shown in FIGS. 4A and 4B are multi-core fiber (MCF) Erbium-doped fiber amplifier (EDFA) based topologies 400 and 450.

Each of the MCF EDFA based topologies 400 and 450 may be functionally similar to the MCF EDFA based topology 300 (and thus, topology 350 of FIG. 3 and the topology 200 of FIG. 2), and may operate in a substantially similar manner, such as when used in, e.g., optical fiber based implementations. For example, each of the MCF EDFA based topologies 400 and 450 similarly may be used within an optical fiber amplifier device (e.g., a pluggable amplifier device). However, the MCF EDFA based topologies 400 and 450 may incorporate, in addition to the use of multiple gain sections (loops) to reduce overall physical length (as done in the MCF EDFA based topology 300), additional measures for controlling gain applied in each of the EDF sections.

In this regard, conventional EDFA implementations may not use equivalent EDF lengths in all sections, as each section may need a different gain. The length of fiber is set to provide a defined gain, and as such the gain may be varied in the different EDF sections by adjusting (varying) the length corresponding to each section. However, with MCF EDFA based implementations, because the loops used for the multipole EDF sections have the same length, additional measures may be used to provide the different gains conventionally introduced by use of variable EDF lengths. In some instances, this may be done by introducing gain adjustments between loops.

For example, gain losses may be introduced or added before or after EDF loops. Introducing such gain loss reduces the end-to-end gain of an EDF length. The gain loss may be a fixed loss, such via a splice 405, as illustrated in the MCF EDFA based topology 400 of FIG. 4A. Alternatively, the gain loss may be applied using a dedicated component, such as a variable optical attenuator (VOA) 455 as illustrated in the MCF EDFA based topology 450 of FIG. 4B, which may allow for introducing a variable (that is, adjustable) loss. Thus, the loss may be adjusted based on requirements or desires of various use scenarios. In some instances, losses in the fiber core may be introduced by altering the fiber structure similar to photo-writing fiber Bragg gratings into fiber.

Figure 5:
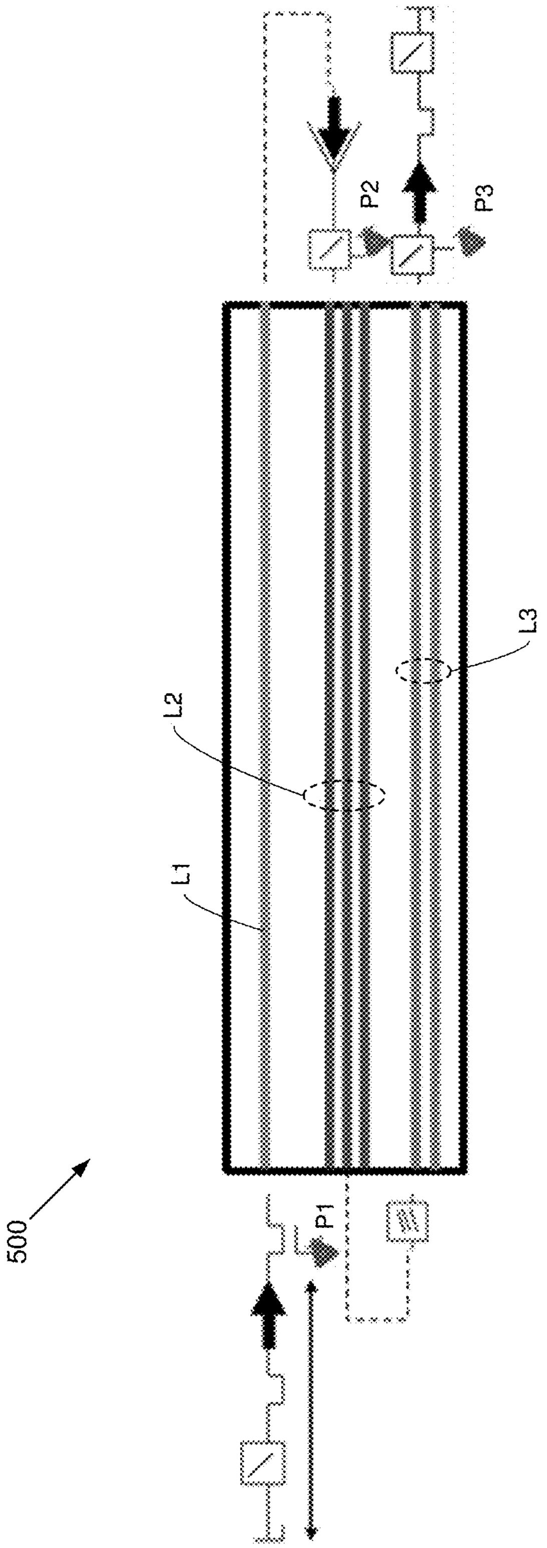
FIG. 5 illustrates an example multi-core fiber (MCF) that provides multiple Erbium-doped optical fiber (EDF) loops with variable multiple EDF lengths per gain sections.

FIG. 5 illustrates an example multi-core fiber (MCF) that provides multiple Erbium-doped optical fiber (EDF) loops with variable multiple EDF lengths per gain sections. Shown in FIG. 5 is multi-core fiber (MCF) Erbium-doped fiber amplifier (EDFA) based MCF EDFA based topology 500.

The MCF EDFA based topology 500 may be functionally similar to the MCF EDFA based topology 300 (and thus, topology 350 of FIG. 3 and the topology 200 of FIG. 2), and may operate in a substantially similar manner, such as when used in, e.g., optical fiber based implementations. For example, the MCF EDFA based topology 500 similarly may be used within an optical fiber amplifier device (e.g., a pluggable amplifier device). However, the MCF EDFA based topology 500 may incorporate, in addition to the use of multiple gain sections (loops) to reduce overall physical length (as done in the MCF EDFA based topology 300), additional measures for controlling gain applied in each of the EDF sections.

In this regard, as noted above, conventional EDFA implementations may not use equivalent EDF lengths in all sections, as each section may need or use a different gain, which conventionally may be achieved by adjusting (varying) the length corresponding to each EDF section. However, with MCF EDFA based implementations, because the loops used for the multiple EDF sections would have the same length, additional measures are needed to provide the different gains conventionally introduced by use of variable EDF lengths. While this may be done by introducing gain adjustments between loops, as described with respect to FIGS. 4A-4B, in some instances other measures may be used, such as by adaptively setting or adjusting the number of loops assigned to each EDF section. In this regard, in some implementations, the number of cores (thus loops) may be increased—that is, MCF fiber with more cores than would otherwise be needed (e.g., where each core is used for each EDF section) is used, to reduce each EDF length and allow for use a multiple of lengths per gain section—that is, multiple passes for some EDF sections.

For example, in the implementation shown in FIG. 5 (the MCF EDFA based topology 500), the first EDF section (corresponding to EDF length L1) has one pass, the second EDF section (corresponding to EDF length L2) has 3 passes (red), and the third EDF section (corresponding to EDF length L3) has 2 passes. Thus, MCF EDFA based topology 500 may utilize, at minimum, a 6-core MCF fiber. Nonetheless, implementing such measures does not necessarily require use of an MCF with the exact number of required cores. Rather, an MCF with more cores can be used. In other words, the multiple passes (loops) merely set a minimum number of cores requirement. Thus, MCF EDFA based topology 500 may be implemented, for example, using an MCF with more than 6 cores, such as 8-core MCF (e.g., the fiber 120 of FIG. 1), with only 6 of the 8 cores being used for the section loop passes.

In some implementations, different measures for varying section gains may be combined. Thus, while not shown in FIGS. 4A-4B and/or FIG. 5, in some embodiments, gain losses as illustrated in FIGS. 4A-4B may be combined with use of multipole/variable number of loop passes, as illustrated in FIG. 5.

Figure 6:
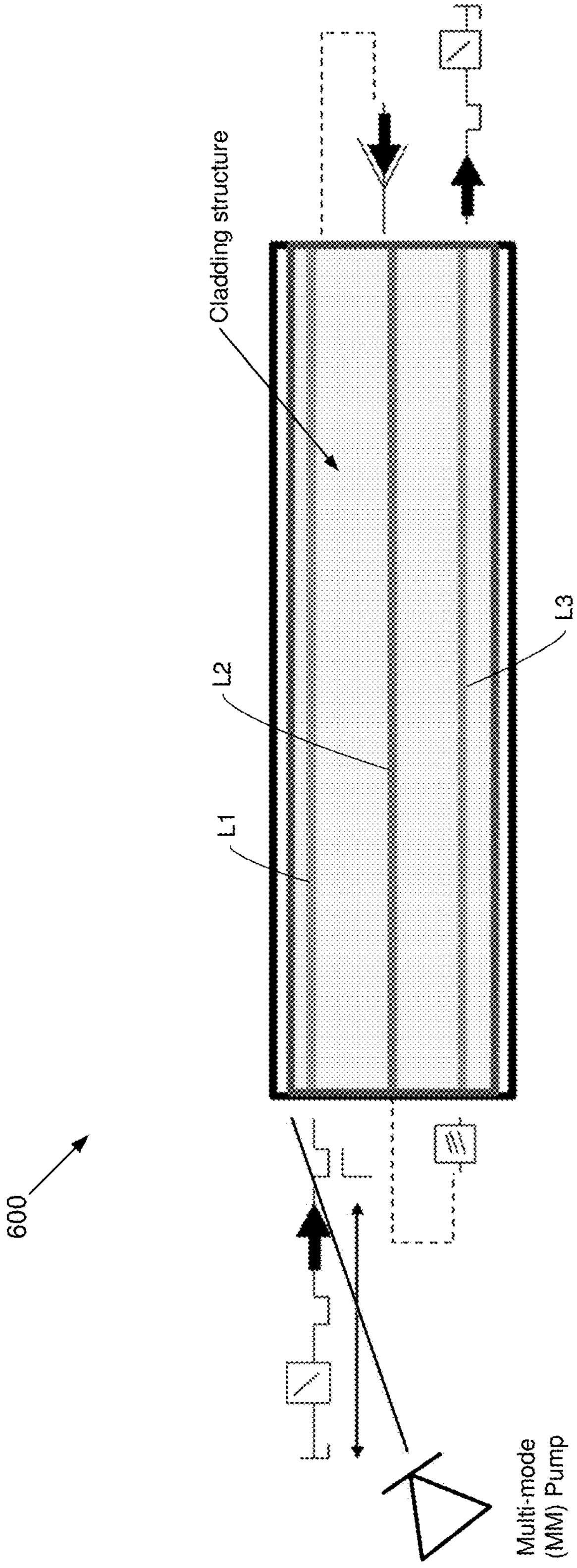
FIG. 6 illustrates an example multi-core fiber (MCF) that provides multiple Erbium-doped optical fiber (EDF) loops with a cladding structure and with pumping using single multi-mode pump.

FIG. 6 illustrates an example multi-core fiber (MCF) that provides multiple Erbium-doped optical fiber (EDF) loops with a cladding structure and with pumping using single multi-mode pump. Shown in FIG. 6 is multi-core fiber (MCF) Erbium-doped fiber amplifier (EDFA) based MCF EDFA based topology 600.

The MCF EDFA based topology 600 may be functionally similar to the MCF EDFA based topology 300 (and thus, topology 350 of FIG. 3 and the topology 200 of FIG. 2), and may operate in a substantially similar manner, such as when used in, e.g., optical fiber based implementations. For example, the MCF EDFA based topology 600 similarly may be used within an optical fiber amplifier device (e.g., a pluggable amplifier device). However, the MCF EDFA based topology 600 may incorporate, in addition to the use of multiple gain sections (loops) to reduce overall physical length (as done in the MCF EDFA based topology 300), additional measures for controlling gain applied in the EDF sections.

In this regard, conventional EDFA implementations typically have single mode pumps coupled into each fiber core alongside the signal. Such approach may provide desired performance in single core based implementations used in conventional solutions. However, with MCF based implementations, other measures or features may be used to optimize performance. For example, in some embodiments, such as the example embodiment illustrated in FIG. 6 (the MCF EDFA based topology 600), an MCF EDFA with a cladding structure (e.g., multi-mode fiber) may be used. Use of such cladding structure may allow for use of a single pump laser—that is, with all cores being pumped using one multi-mode pump. Such approach may allow for combining the benefits of using a single pump that may be used in parallel designs with the advantages of using serial design to provide bigger effective overall length. In some implementations, a combination of single multi-core pumping and single mode pumping may be used in one or all ports.

Figure 7:
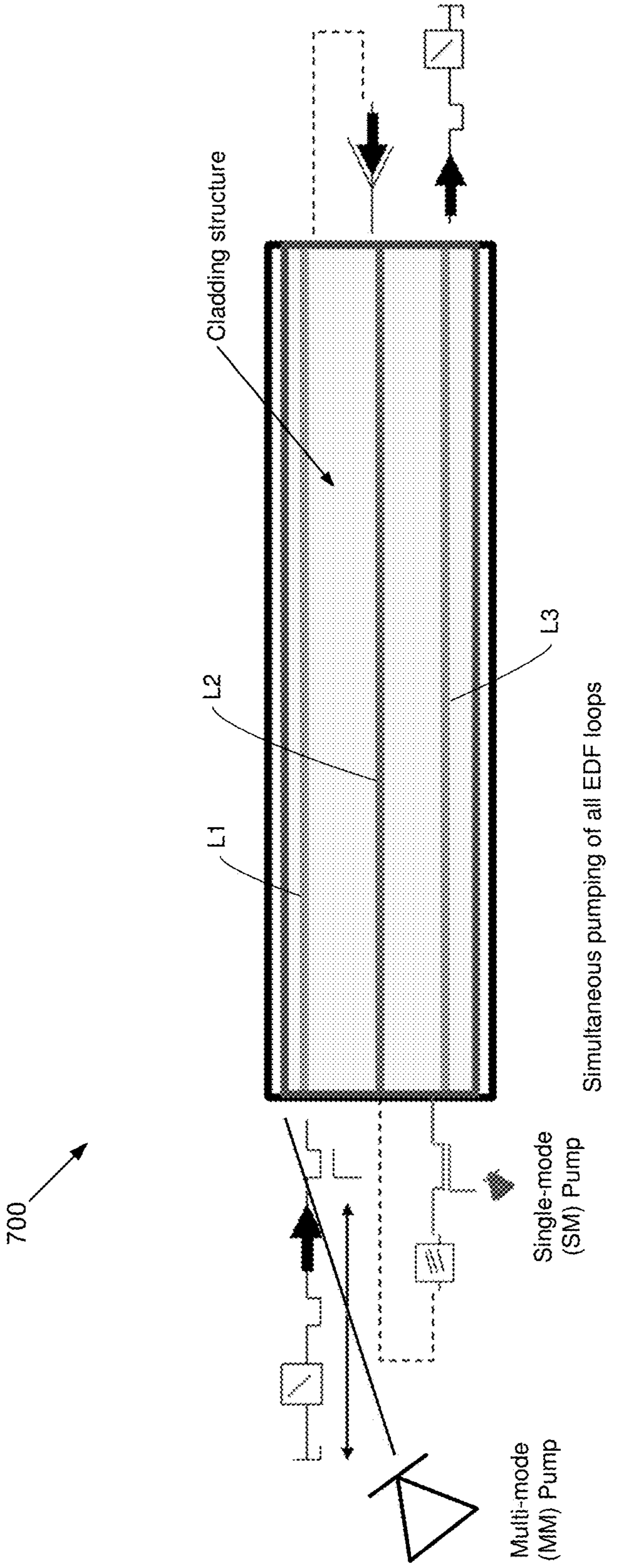
FIG. 7 illustrates an example multi-core fiber (MCF) that provides multiple Erbium-doped optical fiber (EDF) loops with a cladding structure and with pumping using single multi-mode pump and a single-mode pump.

FIG. 7 illustrates an example multi-core fiber (MCF) that provides multiple Erbium-doped optical fiber (EDF) loops with a cladding structure and with pumping using single multi-mode pump and a single-mode pump. Shown in FIG. 7 is multi-core fiber (MCF) Erbium-doped fiber amplifier (EDFA) based MCF EDFA based topology 700.

The MCF EDFA based topology 700 may be similar to the MCF EDFA based topology 600 as described with respect to FIG. 6, and as such may similarly comprise, in addition to the use of multiple gain sections (loops) to reduce overall physical length (as done in the MCF EDFA based topology 300), an MCF EDFA with a cladding structure (e.g., multi-mode fiber) for facilitating use of a single multi-mode pump. However, the MCF EDFA based topology 700 may additionally incorporate a single-mode pump, as shown in FIG. 7. In this regard, the use of the single-mode pump, in conjunction with the use of the multi-mode pump and the cladding structure, may enable simultaneous pumping of all EDF loops.

An example fiber amplifier for amplifying signal light, in accordance with the present disclosure, comprises one or more pumps configured to pump light during the amplifying, and a fiber doped with an active dopant for communicating the signal light within the fiber amplifier during the amplifying, where the fiber is in optical communication with the signal light and in optical communication with the one or more pumps, where the fiber comprises a multiple-core fiber (MCF), where the amplifying comprises applying a plurality of gain sections, with each gain section associated with a corresponding fiber length, and where applying one or more of the plurality of gain sections comprises use of one or more loops via one or more corresponding cores in the multiple-core fiber (MCF).

In an example embodiment, the fiber comprises an Erbium-doped fiber (EDF). As such, the fiber amplifier is Erbium-doped fiber amplifier (EDFA).

In an example embodiment, the fiber amplifier is configured to apply gain adjustment before or after at least one loop. In an example embodiment, the fiber amplifier is configured to apply the gain adjustment as a fixed adjustment. In an example embodiment, the fiber amplifier is configured to apply the gain adjustment as a variable and/or modifiable adjustment. In an example embodiment, the fiber amplifier comprises a gain adjustment component configured to apply the gain adjustment. In an example embodiment, the gain adjustment component comprises a variable optical attenuator (VOA). In an example embodiment, the fiber comprises a structural feature for enabling applying of the gain adjustment. In an example embodiment, the structural feature comprises a splice between two loops within the multiple-core fiber (MCF). In an example embodiment, the structural feature comprises an altering of structure of the fiber similar to Bragg gratings.

In an example embodiment, the use of loops comprises assigning a different number of loops to one of the plurality of gain sections compared to a number of loops assigned to another one of the plurality gain sections.

In an example embodiment, the one or more pumps comprise a single pump configured to pump light for two or more of the plurality of gain sections. In an example embodiment, the single pump comprises a multi-mode pump.

In an example embodiment, the fiber comprises a structure for enabling operation of a single pump to pump light for two or more of the plurality of gain sections. In an example embodiment, the structure comprises a cladding structure. In an example embodiment, the single pump comprises a multi-mode pump. In an example embodiment, the fiber amplifier further comprises a second pump configured to operate in conjunction with the single pump. In an example embodiment, the second pump comprises a single-mode pump.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A fiber amplifier for amplifying signal light, the fiber amplifier comprising:
- one or more pumps configured to pump light during the amplifying; and
- a fiber doped with an active dopant for communicating the signal light within the fiber amplifier during the amplifying,
- wherein the fiber is in optical communication with the signal light and in optical communication with the one or more pumps,
- wherein the fiber comprises a multiple-core fiber (MCF),
- wherein the fiber further comprises a plurality of gain sections for applying gain during the amplifying, with each gain section associated with a corresponding fiber length,
- wherein one or more of the plurality of gain sections comprise one or more loops via one or more corresponding cores in the multiple-core fiber (MCF), and
- wherein use of the one or more loops comprises assigning a different number of loops to one of the plurality of gain sections compared to a number of loops assigned to another one of the plurality gain sections.

2. The fiber amplifier of claim 1, wherein the fiber comprises an Erbium-doped fiber (EDF).

3. The fiber amplifier of claim 1, wherein the fiber amplifier is configured to apply gain adjustment before or after at least one loop.

4. The fiber amplifier of claim 3, wherein the fiber amplifier is configured to apply the gain adjustment as a fixed adjustment.

5. The fiber amplifier of claim 3, wherein the fiber amplifier is configured to apply the gain adjustment as a variable and/or modifiable adjustment.

6. The fiber amplifier of claim 3, further comprising a gain adjustment component configured to apply the gain adjustment.

7. The fiber amplifier of claim 6, wherein the gain adjustment component comprises variable optical attenuator (VOA).

8. The fiber amplifier of claim 3, wherein the fiber comprises a structural feature for enabling applying the gain adjustment.

9. The fiber amplifier of claim 8, wherein the structural feature comprises a splice between two loops within the multiple-core fiber (MCF).

10. The fiber amplifier of claim 8, wherein the structural feature comprises an altering of structure of the fiber similar to Bragg gratings.

11. The fiber amplifier of claim 1, wherein the one or more pumps comprise a single pump configured to pump light for two or more of the plurality of gain sections.

12. The fiber amplifier of claim 11, wherein the single pump comprises a multi-mode pump.

13. The fiber amplifier of claim 1, wherein the fiber comprises a structure for enabling operation of a single pump to pump light for two or more of the plurality of gain sections.

14. The fiber amplifier of claim 13, wherein the structure comprises a cladding structure.

15. The fiber amplifier of claim 13, wherein the single pump comprises a multi-mode pump.

16. The fiber amplifier of claim 13, further comprising a second pump configured to operate in conjunction with the single pump.

17. The fiber amplifier of claim 16, wherein the second pump comprises a single-mode pump.

* * * * *